United States Patent
Padala et al.

(10) Patent No.: US 11,714,667 B2
(45) Date of Patent: *Aug. 1, 2023

(54) AUTOMATED SCALING OF APPLICATION IN VIRTUAL DATA CENTERS

(71) Applicant: VMware, Inc., Palo Alto, CA (US)

(72) Inventors: Pradeep Padala, San Jose, CA (US); Aashish Parikh, Cupertino, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/523,235

(22) Filed: Jul. 26, 2019

(65) Prior Publication Data

US 2020/0089521 A1    Mar. 19, 2020

Related U.S. Application Data

(63) Continuation of application No. 15/359,435, filed on Nov. 22, 2016, now Pat. No. 10,365,942, which is a continuation of application No. 14/798,432, filed on Jul. 13, 2015, now Pat. No. 9,529,637, which is a continuation of application No. 13/893,249, filed on May 13, 2013, now Pat. No. 9,081,622.

(51) Int. Cl.
   *G06F 9/455*    (2018.01)
   *G06F 9/50*     (2006.01)

(52) U.S. Cl.
   CPC ............ *G06F 9/45558* (2013.01); *G06F 9/50* (2013.01); *G06F 9/5005* (2013.01); *G06F 9/5072* (2013.01); *G06F 9/5077* (2013.01); *G06F 9/5061* (2013.01); *G06F 2009/4557* (2013.01)

(58) Field of Classification Search
   None
   See application file for complete search history.

(56) References Cited

U.S. PATENT DOCUMENTS

2011/0271276 A1    11/2011    Ashok et al.

FOREIGN PATENT DOCUMENTS

WO    2013006708 A1    1/2013

OTHER PUBLICATIONS

Iqbal et al., "Adaptive resource provisioning for read intensive multi-tier applications in the cloud", Jun. 2010, Elsevier, pp. 871-879. (Year: 2010).*

De Ceulaer, Bart, "European Search Report", European Application No. 14167682.5, dated May 6, 2016, 8 pages.

(Continued)

*Primary Examiner* — Qing Yuan Wu
(74) *Attorney, Agent, or Firm* — Barta, Jones & Foley, PLLC

(57) ABSTRACT

A system and method for autoscaling a multi-tier application, that has components executing on a plurality of tiers of a virtual data center, allocates resources to each of the plurality of tiers based on cost and performance. An application performance is determined, and a new application performance is estimated based at least partially on an application reservation and an application limit. An optimized utility of the application is calculated based on the cost to execute the application, the application reservation, and the application limit. A scaling factor for each tier is then determined to scale up or down a number of virtual machines operating in each of the tiers.

20 Claims, 5 Drawing Sheets

(56) References Cited

OTHER PUBLICATIONS

Unknown, "Amazon CloudWatch", http://aws.amazon.com/cloudwatch, captured May 13, 2013, 5 pages.
Unknown, "Amazon Elastic Compute Cloud (Amazon EC2)", http://aws.amazon.com/ec2, captured May 13, 2013, 16 pages.
Unknown, "Amazon Web Services Blog", http://aws.amazon.com/ec2, captured May 13, 2013, 3 pages.
Unknown, "Introduction to lp solve 5.5.2.0", http://lpsolve.sourceforge.net/5.5, captured May 13, 2013, 3 pages.
Epping, Duncan, "vCD—Allocation Models", http://www.yellow-bricks.com/201 0/09/22/vcd-allocation-models/, Sep. 22, 2010, 15 pages.
Padala, Pradeep et al., "Automated Control of Multiple Virtualized Resources", Hewlett-Packard Development Company, L.P. copyright 2008, 17 pages.
Stewart, Christopher et al., "Exploiting Nonstationarity for Performance Prediction", EuroSys '07, Mar. 21-23, 2007, Lisbon, Portugal, copyright 2007, 14 pages.
Urgaonkar, Bhuvan et al., "An Analytical Model for Multi-tier Internet Services and Its Applications", In Proceedings of the D International Conference on Measurements and modeling of computer systems, Jun. 2005, 13 pages.
Zhu, Xiaoyun et al., "What Does Control Theory Bring to Systems Research?", Operating Systems Review, 43(1), 2009, 8 pages.
Wang, Zhikui et al., "AutoParam: Automated Control of Application-Level Performance in Virtualized Server Environments," Hewlett Packard Laboratories, May 2007, 6 pages.

\* cited by examiner

AUTOMATED SCALING OF APPLICATION IN VIRTUAL DATA CENTERS

CROSS-REFERENCE TO RELATED APPLICATION

This application is a continuation of U.S. patent application Ser. No. 15/359,435, filed Nov. 11, 2016, entitled "AUTOMATED SCALING OF APPLICATIONS IN VIRTUAL DATA CENTERS," which is a continuation of U.S. patent application Ser. No. 14/798,432, filed Jul. 13, 2015, entitled "AUTOMATED SCALING OF APPLICATIONS IN VIRTUAL DATA CENTERS," now U.S. Pat. No. 9,529,637 issued Dec. 27, 2016, which is a continuation of U.S. patent application Ser. No. 13/893,249, filed May 13, 2013, entitled "AUTOMATED SCALING OF APPLICATIONS IN VIRTUAL DATA CENTERS," now U.S. Pat. No. 9,081,622 issued Jul. 14, 2015, which is incorporated herein by reference.

BACKGROUND

A virtual data center is implemented using entities such as physical hosts, virtual machines, storage devices, storage area networks, and applications running on the virtual machines. A configuration involving the various entities of the virtual datacenter may undergo considerable changes over a period of time. For example, there may be a change in the configuration when a virtual machine is added or deleted. In addition, there may be changes in physical inventory, where physical hosts are added and/or deleted. There may also be a change when a virtual data store is added or deleted.

Elasticity is an important feature of virtual data centers. Elasticity refers to the ability to scale up or down applications to handle changing workload conditions. Typically, a virtual data center provides scaling based on resource thresholds set by a user. These thresholds are static values determined, generally, at the initialization of the virtual data center. The thresholds are commonly based on specific conditions (e.g., average processor usage>70%), and are set by the user. However, scaling based on virtual machine resource usage is not sufficient to scale multi-tier applications. Additionally, applications that involve multiple tiers often have complicated dependencies, further complicating a determination of which tier and resource (CPU, memory, storage etc.) to scale.

SUMMARY

A system and method for autoscaling a multi-tier application, that has components executing on a plurality of tiers of a virtual data center, allocates resources to each of the plurality of tiers based on cost and performance. An application performance is determined, and a new application performance is estimated based at least partially on an application reservation and an application limit. An optimized utility of the application is calculated based on the cost to execute the application, the application reservation, and the application limit. A scaling factor for each tier is then determined to scale up or down a number of virtual machines operating in each of the tiers.

A method for autoscaling the multi-tier application in accordance with an embodiment of the present disclosure comprises determining a performance of a multi-component application distributed across tiers, estimating a new performance based at least partially on an application reservation and an application limit, and calculating an optimized utility of the application based on a cost to execute the application, the application reservation, and the application limit. The method also includes determining a scaling factor for each of the tiers. In some embodiments, the steps of this method are performed when program instructions contained in a computer-readable storage medium is executed by one or more processors.

A distributed computer system in accordance with an embodiment of the invention comprises a plurality of clusters of host computers and at least one virtual manager operably connected to the clusters of host computers. Each of the host computers includes a processor, memory and a network interface, the host computer being configured to support a plurality of clients. The at least one virtual manager is configured to: determine a performance of a multi-component application distributed across tiers; estimate a new performance based at least partially on an application reservation and an application limit; calculate an optimized utility of the application based on a cost to execute the application, the application reservation, and the application limit; and determine a scaling factor for each of the tiers.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
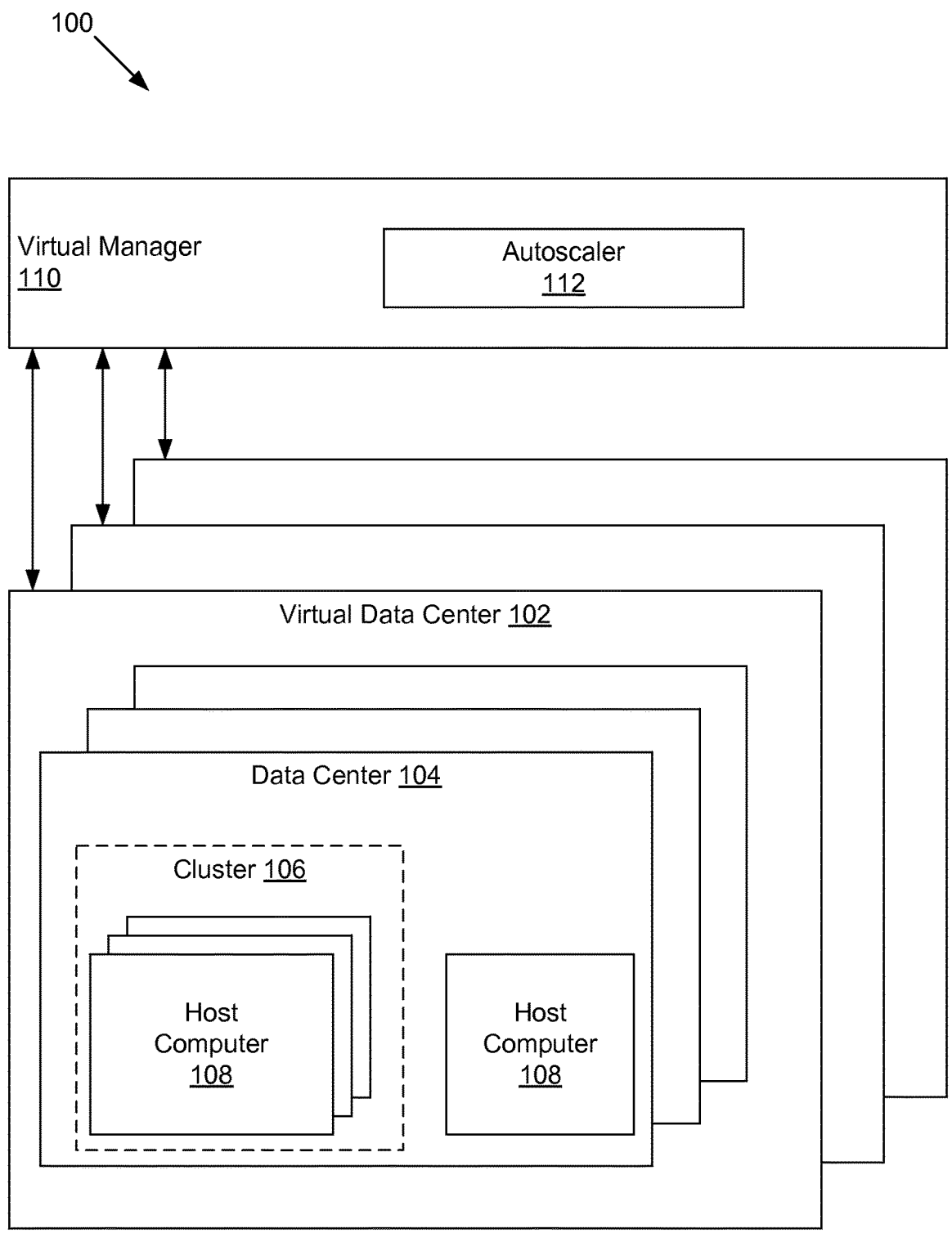
FIG. 1 depicts a block diagram of a virtualized computer system according to one embodiment of the invention.

FIG. 1 depicts a block diagram of a virtualized computer system 100 in which one or more embodiments of the present invention may be practiced. The computer system 100, which may include one or more virtual data centers 102 and a virtual manager 110, in some cases, can be referred to as "the cloud." Host computers 108 (also referred to herein as "servers") are configured to deliver virtualization-based distributed services to information technology environments. Each host computer 108 provides a virtualization layer that abstracts processor, memory, storage, and/or networking resources into multiple virtual machines that run side-by-side on the same physical host computer. In one embodiment, virtualization software can be installed directly on the server hardware to insert a virtualization layer between the hardware and the operating system. The virtualization software partitions a physical host computer into multiple secure and portable virtual machines that operate on the same physical host computer. Each virtual machine represents a complete system-with one or more processors, memory, networking, storage, and/or BIOS.

The host computers 108 may be organized into a cluster 106. One or more clusters 106 and the host computers 108 can then be organized into a data center 104. One or more data centers 104 can be organized into a virtual data center 102. One or more virtual data centers 102 can be organized into the virtualized computer system 100. The one or more virtual data centers 102, and ultimately the host computers 108 included therein, can be managed via the virtual manager 110. The virtual manager 110 manages the virtual infrastructure, including managing the host computers 108, the virtual machines running within each host computer 108, provisioning, migration, resource allocations, and so on.

Each virtual data center 102 may be configured to host one or more multi-tier applications. Each virtual data center 102, as will be described below, comprises multiple virtual machines which may be organized into tiers. Multi-tier applications may utilize the different tiers to perform different functions, such as, one tier to perform web server functionality, and another tier to perform application server functionality and another tier to perform database functionality. Each tier may have an associated cost and performance target. The virtual manager 110 includes an autoscaler 112, which automatically scales applications operating in the virtual data centers 102 so that the overall utility of each virtual data center 102 is maximized. The utility of each virtual data center 102 is a measurement of both cost and performance of the applications. The manner in which the autoscaler 112 determines how to scale resources will be described in greater detail below with reference to FIG. 4.

The management operations of the virtual manager 110 can be performed via a client application (not shown). For example, each configuration task, such as configuring storage and network connections or managing the service console, can be accomplished centrally through the client application. One embodiment provides a stand-alone application version of the client application. In another embodiment, the client application is implemented as a web browser application that provides management access from any networked device.

Figure 2:
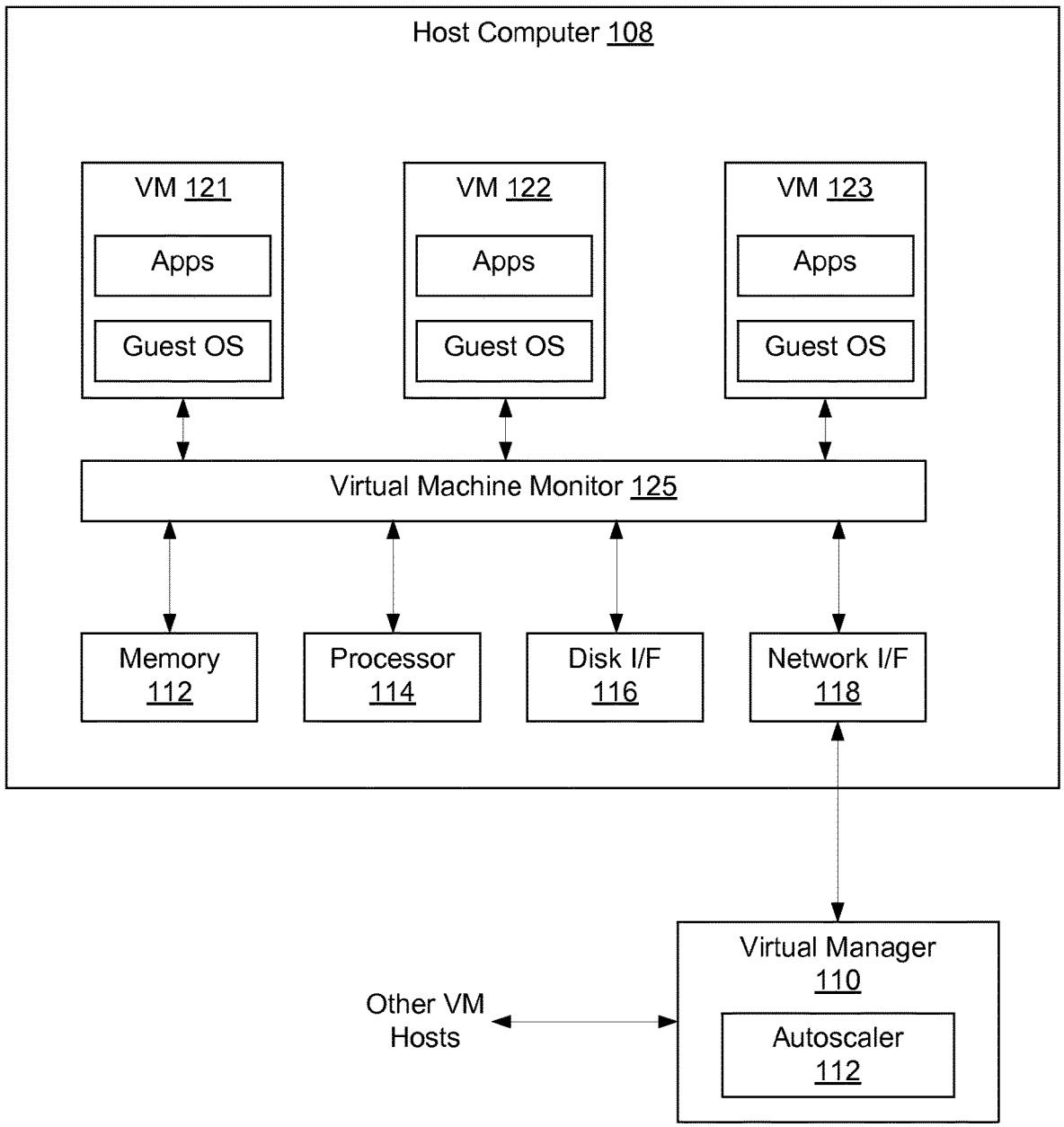
FIG. 2 depicts a block diagram of a host computer and the virtual manager according to one embodiment of the invention.

FIG. 2 depicts a block diagram of one of the host computers 108 and the virtual manager 110 shown FIG. 1, according to one embodiment of the invention. As described above with respect to FIG. 1, the virtualized environment 100 includes the host computers 108, each of which may comprise components of a computing device, and may be implemented as part of a cluster of computing devices. One or more virtual machines are configured within each host computer 108, represented in FIG. 2 as VM 121, VM 122, and VM 123. The VMs 121, 122, 123 share hardware resources of the host computer 108, such as a system memory 112, a processor 114, a disk interface 116, and a network interface 118. Examples of the disk interface 116 are a host bus adapter and a network file system interface. An example of the network interface 118 is a network adapter, also referred to as a Network Interface Card (NIC). In some embodiments, a plurality of NICs is included in the network interface 118. The virtual manager 110 may be coupled to the host computer 108 of FIG. 2 via the network interface 118.

The virtual machines VM 121-123 execute on top of a virtual machine monitor 125, which is a software interface layer that enables sharing of the hardware resources of the host computer 108 by the virtual machines. The virtual machine monitor 125 may execute on top of the operating system of the host computer 108 or directly on hardware components of the host computer 108. In some embodiments, the virtual machine monitor 125 runs on top of a hypervisor that is installed on top of the hardware resources of the host computer 108. Together, the virtual machines 121-123 and the virtual machine monitor 125 create virtualized computer systems that give the appearance of being distinct from the host computer 108 and from each other. Each virtual machine 121-123 may include a guest operating system and one or more guest applications. The guest operating system is a master control program of the virtual machine and, among other things, the guest operating system forms a software platform on top of which the guest applications run.

Figure 3:
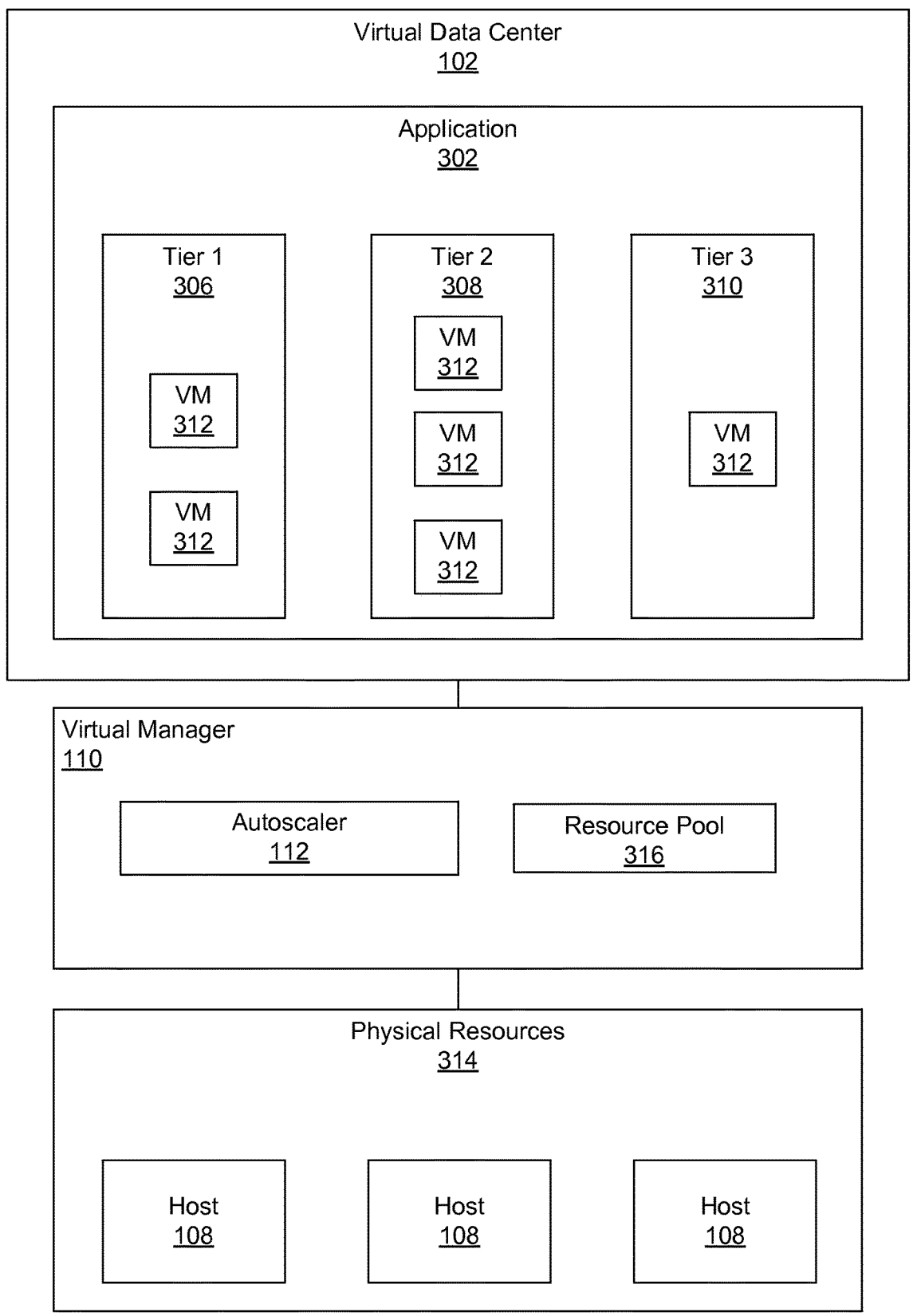
FIG. 3 depicts a block diagram illustrating one embodiment of a virtual data center for executing a multi-tier application according to one embodiment of the invention.

FIG. 3 is a schematic block diagram illustrating one embodiment of the virtual data center 102 for executing a multi-tier application (hereinafter "application") 302. A multi-tier application, as used herein, refers to, generally, a collection of multiple software components which are concurrently executed in a coordinated manner. A multi-tier application may refer to a distributed application, configured to execute on one or more host computers or virtual machines. One example of a multi-tier application is an application that includes a database component, a financial software component, and a user-interface software component. Each of these components may be configured to operate on one of the depicted tiers (tier 1, 2 or 3) in a coordinated manner, where the multiple described components are executed on the virtual machines 312 associated with the different tiers 306, 308, 310. Accordingly, the tier 1 may be a collection of virtual machines 312 configured to operate as a database. In another example, the application 302 includes database components, web server components, etc., each configured to operate on a different tier.

Each tier 306, 308, 310 may have an associated cost and performance level. The cost may be assigned to each of the tiers in the virtual data center 102. These costs are then automatically assigned to a virtual machines 312 associated with the tiers 306, 308, 310 when that virtual machine is instantiated in a virtual infrastructure. The cost of each tier 306, 308, 310 or each virtual machine 312 may be determined based on costs that were assigned to computing resources of computing devices in the physical infrastructure. Because the physical infrastructure does not change as frequently as the virtual infrastructure, the assignment of costs to the tiers may be modified based on the virtual infrastructure (i.e., the virtual data center 102). For example, it may be more likely that the virtual machines 312 are added to the virtual infrastructure than computing devices are added to the physical infrastructure.

The virtual and physical infrastructure may be organized into hierarchies. A user may access the hierarchies and instantiate virtual machines to the virtual infrastructure or add costs to computing devices in the physical infrastructure via the virtual manager 110.

The costs for a computing device may be configured for general use of the computing device itself or may be further defined for computing resources of the computing device. Different costs may be assigned to different computing resources. For example, different factors may be used to determine the costs for each computing resource, such as the speed of the computing resource, the size of the data storage, disk read and write, disk read, disk write, memory, network data received and transmitted, network data received, network data transmitted, and virtual CPU (vCPU). The costs may be based on units, such as gigahertz (GHz) for speed and gigabytes (GB) for storage, or in the alternative, based on the number of virtual machines instantiated. For example, the cost of an application may be determined as $1/hr. per virtual machine instantiated in a first tier, and $3/hr. per virtual machine instantiated in a second, higher performance tier. Accordingly, depending on the performance level of the first and second tiers, it may be more effective to instantiate two additional virtual machines in the first tier even if the performance is not equivalent to a single virtual machine in the second tier.

The physical host computers 108, as described above, and possibly along with other hardware devices connected directly or indirectly to the host computers, provide certain physical computing resources 314 that may be used for the execution of the application 302. Although a single application is depicted here, it is to be understood that the virtual data center 102 is capable of supporting multiple applications 302, with each application utilizing multiple tiers, as depicted. Some or all of the physical resources 314 may be provided without virtualization or with only partial virtualization. The physical resources 314 may include a variety of resources, such as processor cycles for executing instructions, system memory, secondary storage, interrupts, timers, and access to various devices. The description below is limited to the computing resources of processor cycles and primary memory for simplicity, although it may also be extended to other physical resources.

The virtual manager 110 is responsible for allocating the physical resources 314 between the different virtual data centers 102, the virtual machines 312, and the applications 302. The virtual manager 110 pools all of the physical resources 314 of the host computers 108, and virtualizes the resources for the virtual data center 102 in a resource pool 316. For example, all of the available processor cycles of all of the host computers 108 may be added together to determine a total number of processor cycles available in the system. In the same manner, all of the system memory in the host computers 108 may be added together to determine the total amount of memory available. These computing resources may be consumed by virtualization components that support the virtual data center 102 and the virtual machines 312. Additionally, the physical resources 314 may be consumed by other applications running on the host computers 108. The remaining physical resources 314 are available for use by the application 302. These remaining physical resources 314 are effectively combined together to form the resource pool 316, as described above.

The virtual manager 110 determines the resource needs of the applications 302. The resource needs may include a minimum amount of processor and memory resources for each application, maximum amounts of processor and memory that may be useful to each application, relative priorities between the applications beyond the required minimums, and service level agreement objectives (or performance guarantees). A wide variety of other parameters may also, or alternatively, be specified depending on a particular implementation. The virtual manager 110 may receive the resource information from a user, or alternatively, retrieve the information directly from the applications. For example, an installation package that includes an application may also include a separate data file that specifies the resource information. In an embodiment, the virtual manager 110 is implemented as software running on one or more physical computers, such as the host computers 308. However, the virtual manager 110 may be implemented in any combination of software and hardware.

Although only one virtual data center 102 is depicted here, the virtual manager 110 is configured to allocate the computing resources of the resource pool 316 between multiple distinct virtual data centers 102. In one embodiment, the virtual manager 110 utilizes the autoscaler 112, as described above, to scale up or down the resources available to the application 302. In one embodiment, the autoscaler 112 increases the performance of the application by adding or subtracting virtual machines 312 to one of the tiers 306, 308 and 310. In another embodiment, the autoscaler 112 increases or decreases a specific number of MHz of processor resources and a specific number of MB of system memory available to the application 302. The manner in which the autoscaler 112 determines how to scale the performance of the application 302, according to embodiments of the present disclosure, will be discussed below in greater detail with reference to FIG. 4.

Figure 4:
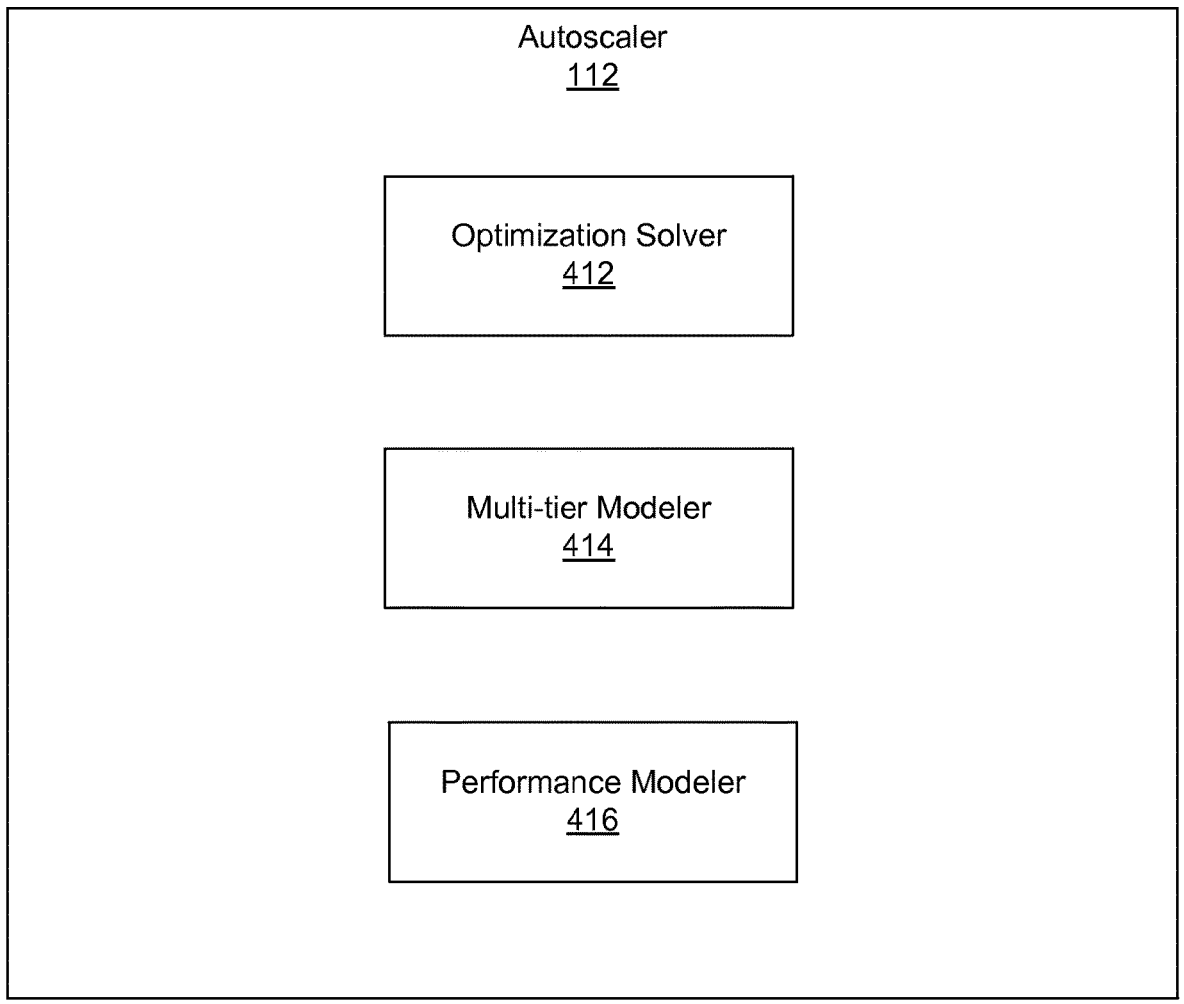
FIG. 4 is a block diagram illustrating one embodiment of an autoscaler for scaling up or down the utility of the virtual data center.

FIG. 4 is a schematic block diagram illustrating one embodiment of the autoscaler 112 for scaling up or down the utility of a virtual data center for executing multi-tier application based on cost and performance. The autoscaler determines the utility of an application, which encapsulates the cost and the performance of the application. As illustrated in FIG. 4, the autoscaler 112 includes an optimization solver 412, a multi-tier modeler 414 and a performance modeler 416, which are described in detail below. In an embodiment, the autoscaler 112 is implemented as software running on one or more physical computers. However, the autoscaler 112 and its components may be implemented in any combination of software and hardware.

The application cost, in one embodiment, refers to the total cost incurred by an application (e.g., the application 302 of FIG. 3). The application cost may be, for example, a dollar amount which is determined according to virtual or physical resource usage as described above. The cost of an application may also be based on the number of virtual machines in the virtual data center dedicated to executing the application. The cost per virtual machine may also vary depending on the tiers that group the virtual machines. In a further embodiment, the cost of each application is partially based on a "reservation" and a "limit" of the application. The reservation refers to the minimum processing resources required to execute the application, and the limit refers to the maximum amount of processing resources allowed to be consumed by the application. In one embodiment, the reservation and the limit refer to a number of virtual machines to be instantiated for the application. For example, as depicted in FIG. 3, the application 302 may have a reservation of six virtual machines 312 to execute the application. A user may determine that the limit of the application is, for example, nine virtual machines 312 spread across the three tiers 306, 308 and 310. The autoscaler 112, when determining the cost of the application may rely on either the current application utilization or, in the alternative, the autoscaler may use the application reservation.

The performance of the application refers to the end-to-end performance of the application and is based on all tiers of the application. Each tier may contribute to the performance differently. The performance, in one embodiment, is based on throughput and latency with respect to the operation of the application (e.g., 10,000 requests/second with an average latency of 50 milliseconds).

The utility of each application may be defined by the following equation:

$$U_a = -C_a * w_{cost} + P_a * w_{perf}$$

where $U_a$ is the utility of the application, $C_a$ is the cost of the application, $w_{cost}$ and $w_{perf}$ are weights for normalizing the cost and the performance, and $P_a$ is the performance of the application. The weights for cost and performance may be predetermined values received by the autoscaler 112 from a user that allow the user to specify the preference of cost vs. performance. If cost is more important, the user may specify a value for $w_{cost}$ that is larger than $w_{perf}$. Absolute importance for cost may be achieved by specifying a $w_{cost}$ that is much higher than $w_{perf}$. To determine the current utility of the virtual data center, the autoscaler 112 is configured to sum the utility of each application executing in the virtual data center.

To determine the optimum combination of cost and performance, an optimization solver 412 of the autoscaler 112 maximizes the utility of each application in the virtual data center. In one embodiment, the optimization solver 412 performs a linear programming formulation to determine an optimum reservation and an optimum limit for each application. The optimization solver 412 is configured to determine the optimum reservation and the optimum limit that minimize cost and maximizes performance.

One example of a linear programming formulation to maximize utility is as follows:

$$\text{maximize } U_{vdc} = \Sigma_{a=0}^{n} w_a * (-C_a * w_{cost} + P_a * w_{perf})$$

subject to:
$\Sigma_a \text{Reservation}_{app} \leq \text{TotalReservation}$
$\Sigma_a \text{Limit}_{app} \leq \text{TotalLimit}$
$\Sigma_a C_{app} \leq \text{CostBudget}$, where $U_{vdc}$ is the total utility of the virtual data center that is summed across all applications. In one embodiment, the autoscaler 112 is configured to prioritize applications in determining the utility of the virtual data center. In the above linear programming formulation, $w_a$ represents a priority weight for a specific application. The sum of reservations and limits for all applications should respect the virtual data center total reservation and total limit. The autoscaler 112 may also be configured to determine the total utility of the virtual data center based in part on a total cost budget. The sum of the costs of the applications is less than or equal to the cost budget. Based on the resulting reservation and limit values, the autoscaler 112 can scale up or down the processing usage of the application, by for example, increasing or decreasing the number of virtual machines.

The multi-tier modeler 414 of the autoscaler 112 is configured to determine how to distribute the above determined reservation and limit among the tiers 306, 308 and 310. The multi-tier modeler 414 is configured to identify the dependencies between the tiers and how each tier contributes to the performance of the application. The multi-tier modeler 414 is configured to generate a scaling factor for each tier by determining the performance of each tier. For example, the multi-tier modeler 414 may be configured to determine the performance of a database component of the application, and a web server component of the application. The multi-tier modeler 414 then determines how each tier is influenced by the number of virtual machines in the tier. Stated differently, the multi-tier modeler 414 is configured to determine a scaling factor that is indicative of how many virtual machines are required to increase the performance of the web server component, for example, by 10%.

The performance modeler 416 of the autoscaler 112 is configured to compute a linear model that approximates the quantitative relationship between the reservation, the limit and the performance based on current operating conditions such as current processor, bandwidth, and memory usage+. The performance modeler 416, in one embodiment, may approximate the quantitative relationship using an auto-regressive-moving-average model such as:

$$P_a(k) = a_1(k)P_a(k-1) + b_1(k)R_a(k) + b_2(k)L_a(k),$$

where the model parameter $a_1(k)$ represents the correlation between the application's past and present performance, and $b_1(k)$ and $b_2(k)$ represent the correlation between the performance limit and the cost limit. In other words, the model represents an assumption that the performance of an application running in a virtual machine is often linearly dependent upon resource constraints.

The autoscaler 112 is configured to determine, based on the above calculations, the number of virtual machines that should be executing in each tier. The autoscaler 112, in one embodiment, divides a desired or required application performance into individual tier components based on the performance modeler 416. As discussed, a scaling factor for each tier may determine the number of virtual machines to be allocated to each tier. The autoscaler 112 is also configured to set the reservation and the limit for each tier based on the scaling factor.

Figure 5:
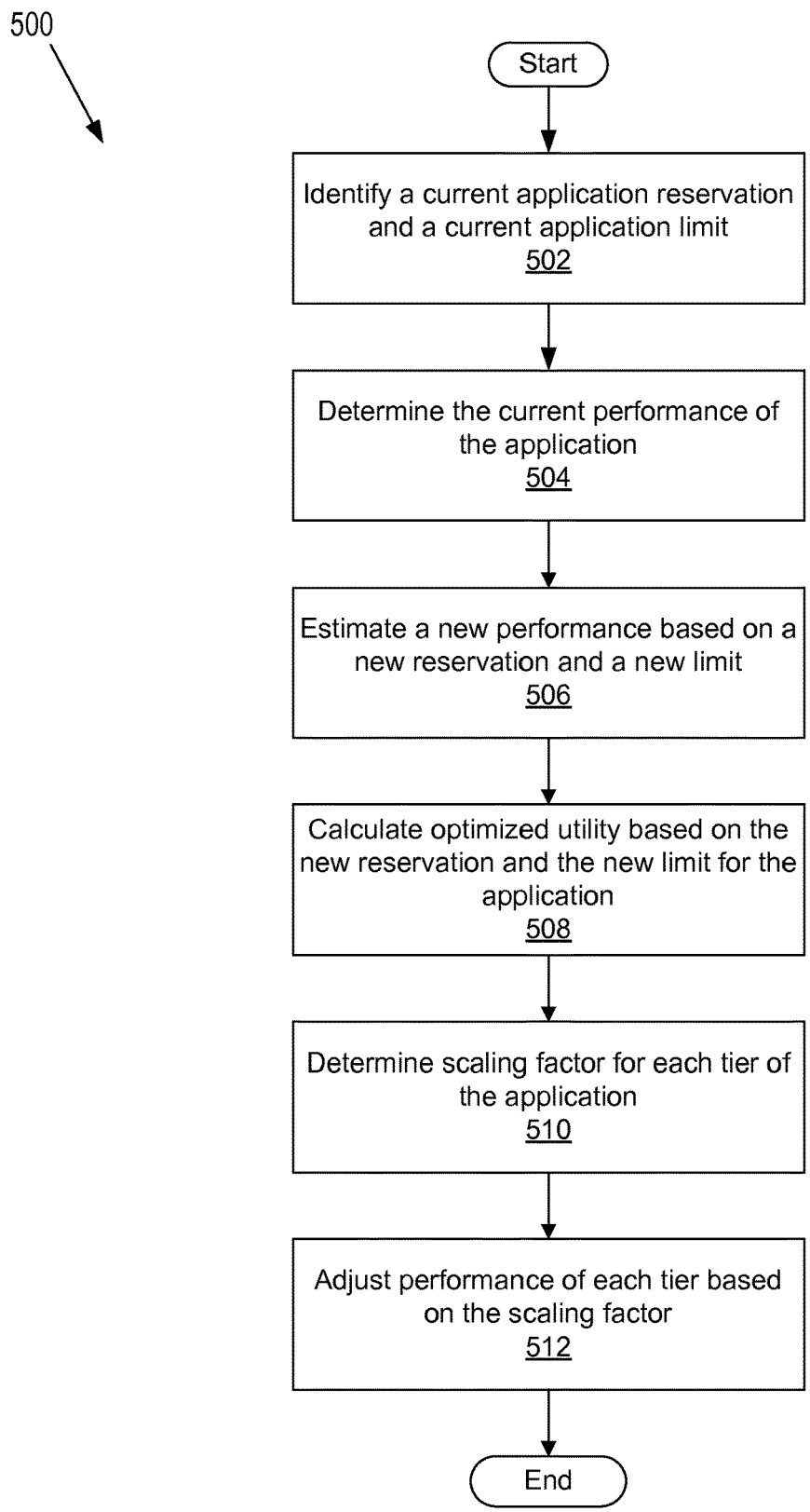
FIG. 5 is a flow chart diagram illustrating one embodiment of a method for autoscaling a multi-tier application in accordance with embodiments of the present invention.

FIG. 5 is a flow chart diagram illustrating one embodiment of a method 500 for autoscaling a multi-tier application in accordance with embodiments of the present disclosure. The method 500 is performed by processing logic that may comprise hardware (circuitry, dedicated logic, etc.), software (such as is run on a general purpose computer system or a dedicated machine), or a combination of both. In one embodiment, the method is performed by an autoscaler (e.g., the autoscaler 112 of FIGS. 1-4).

The method 500 begins and the processing logic, at block 502, identifies a current application reservation and a current application limit. In one embodiment, identifying the current application reservation and the current application limit comprises retrieving the reservation and limit from the application. Alternatively, the processing logic may maintain a list of application reservations and limits, and perform a lookup to retrieve the reservation and the limit.

At block 504, the processing logic determines the current performance of the application. In one embodiment, determining the current performance of the application comprises measuring end-to-end throughput and latency of the application. For example, if the application is a file serving application, determining the performance of the application comprises measuring the amount of time between sending a file request and receiving the file and measuring the bandwidth of the file transfer.

At block 506, the processing logic estimates a new performance based on a new reservation and a new limit. In one embodiment, estimating a new performance based on the new reservation and the new limit comprises modeling the performance of the application using a starting reservation and a starting limit. For example, the processing logic may assume R=1 and L=1 while estimating performance according to the calculations presented above. The processing logic performs a linear regression to determine an optimum reservation R value and an optimum limit L value.

At block 508, the processing logic calculates the optimized utility of the application based on the cost of the application, the new reservation, and the new limit for the application. Subsequently, the processing logic may determine a utility for the entire virtual data center by summing the utility values of the applications. The processing logic, in one example, performs a linear optimization to determine the maximum utility based on cost and performance.

At block 510, the processing logic determines a scaling factor for each tier of the application. For example, the processing logic may divide a required application performance into tier components and then generate scale factors for each of the individual tiers. The scale factors are based on a determination of how each tier component is influenced by the number of virtual machines in the tier, and how many additional virtual machines are required to increase the overall performance of the application by, for example, 10%.

At block 512, the processing logic adjusts the performance of each tier in the application based on the scaling factor. For example, the processing logic may apply the new reservation and limit values, as adjusted by the scaling values, to each tier of the application. Accordingly, the processing logic may instantiate new virtual machines to meet the new reservation, or alternatively, power off virtual machines to reduce the performance of a particular tier below the limit. The method 500 then ends.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blue-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method comprising:
    determining a performance of a multi-component application distributed across a plurality of tiers based on at least one processing resource parameter for the multi-component application;
    calculating, via a processor, an optimized utility of the multi-component application based on a cost at each tier of the plurality of tiers to execute the multi-component application and the at least one processing resource parameter; and
    for one or more of the plurality of tiers, adjusting a count of virtual computing instances assigned to the one or more of the plurality of tiers based at least on the calculating and a number of virtual computing instances required to increase the performance of the multi-component application by a pre-determined percentage.

2. The method of claim 1, wherein adjusting the number of virtual computing instances assigned to the one or more of the plurality of tiers is based on a scaling factor determined for each of the plurality of tiers.

3. The method of claim 2, wherein determining the scaling factor for each of the plurality of tiers comprises identifying the number of virtual computing instances required to increase the performance of the multi-component application by a pre-determined percentage.

4. The method of claim 1, wherein the at least one processing resource parameter includes an application reservation that comprises a minimum performance level for the multi-component application.

5. The method of claim 4, wherein the application reservation comprises a minimum performance level for the multi-component application.

6. The method of claim 5, wherein the calculating the optimized utility of the application comprises performing a linear optimization where the application reservation is less than or equal to a total reservation, the application limit is less than or equal to a total limit, and the cost is less than or equal to a cost budget.

7. The method of claim 1, wherein the calculated optimized utility of the multi-component application minimizes cost and maximizes performance at each tier of the plurality of tiers.

8. A system comprising: a host computer including a processor, memory and a network interface, the host computer being configured to support a plurality of clients; and
at least one virtual manager operably connected to the host computer, the at least one virtual manager being configured to:
determine a performance of a multi-component application distributed across a plurality of tiers based on at least one processing resource parameter for the multi-component application;
calculate an optimized utility of the multi-component application based on a cost at each tier of the plurality of tiers to execute the multi-component application and the at least one processing resource parameter; and
for one or more of the plurality of tiers, increase or decrease a count of virtual computing instances assigned to the one or more of the plurality of tiers based at least on the calculating and a number of virtual computing instances required to increase the performance of the multi-component application by a pre-determined percentage.

9. The system of claim 8, wherein adjusting the number of virtual computing instances assigned to the one or more of the plurality of tiers is based on a scaling factor determined for each of the plurality of tiers.

10. The system of claim 9, wherein determining the scaling factor for each of the plurality of tiers comprises identifying the number of virtual computing instances required to increase the performance of the multi-component application by a pre-determined percentage.

11. The system of claim 8, wherein the at least one processing resource parameter includes an application reservation that comprises a minimum performance level for the multi-component application.

12. The system of claim 11, wherein the application reservation comprises a minimum performance level for the multi-component application.

13. The system of claim 12, wherein the calculating the optimized utility of the application comprises performing a linear optimization where the application reservation is less than or equal to a total reservation, the application limit is less than or equal to a total limit, and the cost is less than or equal to a cost budget.

14. The system of claim 8, wherein the performance is based on at least one of a latency and a throughput of the multi-component application.

15. One or more computer-readable storage devices comprising computer-executable instructions that when executed by one or more processors, cause the one or more processors to perform the following operations:
determining a performance of a multi-component application distributed across a plurality of tiers based on at least one processing resource parameter for the multi-component application;
calculating an optimized utility of the multi-component application based on a cost at each tier of the plurality of tiers to execute the multi-component application and the at least one processing resource parameter; and
for one or more of the plurality of tiers, adjusting a count of virtual computing instances assigned to the one or more of the plurality of tiers based at least on the calculating and a number of virtual computing instances required to increase the performance of the multi-component application by a pre-determined percentage.

16. The one or more computer-readable storage devices of claim 15, wherein adjusting the number of virtual computing instances assigned to the one or more of the plurality of tiers is based on a scaling factor determined for each of the plurality of tiers.

17. The one or more computer-readable storage devices of claim 16, wherein determining the scaling factor for each of the plurality of tiers comprises identifying the number of virtual computing instances required to increase the performance of the multi-component application by a pre-determined percentage.

18. The one or more computer-readable storage devices of claim 15, wherein the at least one processing resource parameter includes an application reservation that comprises a minimum performance level for the multi-component application.

19. The one or more computer-readable storage devices of claim 18, wherein the application reservation comprises a minimum performance level for the multi-component application.

20. The one or more computer-readable storage devices of claim 19, wherein the calculating the optimized utility of the application comprises performing a linear optimization where the application reservation is less than or equal to a total reservation, the application limit is less than or equal to a total limit, and the cost is less than or equal to a cost budget.

* * * * *